United States Patent
Williams

(10) Patent No.: US 9,722,439 B2
(45) Date of Patent: Aug. 1, 2017

(54) BAG WITH A PORTABLE ELECTRONIC DEVICE CHARGER

(71) Applicant: Edward Williams, Lucust Grove, VA (US)

(72) Inventor: Edward Williams, Lucust Grove, VA (US)

( * ) Notice: Subject to any disclaimer, the term of this patent is extended or adjusted under 35 U.S.C. 154(b) by 64 days.

(21) Appl. No.: 14/569,590

(22) Filed: Dec. 12, 2014

(65) Prior Publication Data

US 2015/0270728 A1 Sep. 24, 2015

Related U.S. Application Data

(60) Provisional application No. 61/969,327, filed on Mar. 24, 2014.

(51) Int. Cl.
*H02J 7/00* (2006.01)

(52) U.S. Cl.
CPC .......... *H02J 7/0044* (2013.01); *H02J 7/0054* (2013.01)

(58) Field of Classification Search
CPC ....... H02J 7/0044; H02J 7/0052; H02J 7/0045
USPC ...................................................... 320/111
See application file for complete search history.

(56) References Cited

U.S. PATENT DOCUMENTS

| 6,434,032 B1* | 8/2002 | Romano | H02J 7/0045 320/113 |
|---|---|---|---|
| 6,870,089 B1 | 3/2005 | Gray | |
| 6,894,457 B2 | 5/2005 | Germagian | |
| 8,593,108 B2 | 11/2013 | Ferber | |
| 2009/0224722 A1 | 9/2009 | Causey | |
| 2010/0231161 A1* | 9/2010 | Brown | B25H 3/02 320/101 |
| 2011/0006729 A1 | 1/2011 | Matthias | |
| 2011/0050162 A1* | 3/2011 | Fallhowe | H02J 7/0027 320/107 |
| 2012/0119900 A1* | 5/2012 | Walther et al. | B60Q 1/268 340/474 |

* cited by examiner

*Primary Examiner* — Sun Lin
(74) *Attorney, Agent, or Firm* — Global Intellectual Property Agency, LLC; Daniel Boudwin

(57) ABSTRACT

Disclosed is a bag with a built in charger for portable electronic devices. The bag includes an interior compartment that is disposed between an interior lining and an exterior of the bag. The interior compartment is adapted to hold a battery unit, which is removably connected to a charging cable and a retractable power cable. The charging cable can be connected to the battery unit via a USB connection, and is adapted to connect to a portable electronic device via a mobile device connection. The retractable power cable can be extended out of the interior compartment through a side opening, and can connect to an electrical outlet via a plug. An electrical connection between the electrical outlet and the plug supplies energy to the battery unit. The energy stored in the battery unit can be used to charge the portable electronic device when an electrical outlet is not readily accessible.

9 Claims, 2 Drawing Sheets

BAG WITH A PORTABLE ELECTRONIC DEVICE CHARGER

CROSS REFERENCE TO RELATED APPLICATION

This application claims the benefit of U.S. Provisional Application No. 61/969,327 filed on Mar. 24, 2014. The above identified patent application is herein incorporated by reference in its entirety to provide continuity of disclosure.

BACKGROUND OF THE INVENTION

Field of the Invention

The present invention relates to a bag with a means to charge a portable electronic device. More specifically, the present invention pertains to an improved bag with a battery unit connected to a charging cable and a power cable, wherein the charging cable can connect to a variety of portable and/or hand held electronic devices. The battery unit is adapted to supply power to the electronic devices to which it is connected so that a user can charge the devices when away from other power sources.

Portable electronic devices, such as mobile phones, tablet computers, and other hand held devices are ubiquitous and have become an essential part of modern daily life. For example, many mobile phones allow people to play games, snap photos, video chat, and navigate the internet, among other things. Unfortunately, the battery duration on many of these types of devices has yet to catch up with the high battery consumption. Accordingly, many people carry charging devices when they travel. However, charging devices can be easily misplaced or lost and are inconvenient to carry.

Additionally, conventional charging units directly supply power from an electrical outlet to the electronic device to which it is connected. Thus, these charging units require the user to locate an electrical outlet to supply power to the mobile phone. In this way, conventional charging units cannot be utilized to charge an electronic device unless an outlet is available nearby. This can be problematic to the user if the user does not have an access to an electrical outlet.

Some people carry external battery packs to supply power to their electronic devices. However, these battery packs are inconvient to transport. Additionally, the battery packs must be charged ahead of time before traveling, and do not comprise a means to receive additional power while traveling. Thus, a battery pack that is convenient to transport and that can receive supplemental power during travel is desired.

The present invention provides a bag for charging portable electronic devices such as a mobile phone, a tablet computer, or other hand held electronic devices. The device comprises a bag having an interior with a lining and an exterior having one or more pockets, wherein the space between the lining and the exterior defines an interior compartment at the bottom of the bag.

The interior compartment comprises a waterproof battery unit that is removably connected to a retractable power cable and a charging cable having a USB connection. The battery unit comprises a plurality of USB ports thereon so that multiple charging cables can be connected to the battery unit at one time to charge multiple electronic devices. The power cable is adapted to establish an electrical connection with an electrical outlet so as to supply power to the battery unit. The battery unit can store the received energy and can utilize it to charge one or more electronic devices when an electrical outlet is not available or accessible to the user. The battery unit may further comprise an indicator light thereon, wherein the light can illuminate to indicate that one or more electronic devices have been completely charged.

Description of the Prior Art

Some devices have been disclosed in the prior art that relate to external charging units for various types of electronic devices. For example, U.S. Published Patent Application Number 2011/0006729 to Matthias discloses a rechargeable battery charging case that can be used to charge electronic devices while the user is travelling. However, the device of Matthias does not relate to a bag having an integrated charging unit.

Other devices have been disclosed in the prior art that claim bags with a means for charging mobile devices. Specifically, U.S. Pat. No. 8,593,108 to Ferber discloses a portable charging system as installed in a bag. The charging system includes a battery, a docking station, a charging apparatus, and a cable. The battery and the docking station are disposed in a pocket that is located in the interior of the bag. Thus, the battery and the docking station are not imbedded in the bag. Similarly, U.S. Pat. No. 6,894,457 to Germagian discloses a carry case with an integrated power supply system for delivering power to multiple electronic devices from a single power source. This device, however, is not secured between the interior lining and the exterior of the bag.

U.S. Published Patent Application Number 2009/0224722 to Causey and U.S. Pat. No. 6,870,089 to Gray discloses a system and apparatus for charging an electronic device using solar energy. The device of Causey discloses a purse with a built in charger having a solar-powered battery. The battery, however, is not concealed under the lining of the bag. Gray discloses a system and apparatus for charging an electronic device using solar energy. The Gray apparatus includes a solar panel that can be opened from the exterior of the bag to receive sunlight. A charging cable can connect the electronic device to the solar panel at the exterior of the bag. Thus, the apparatus of Gray is disposed on the exterior of the bag rather than the interior of the bag.

The prior art devices are limited in that none of the devices disclose a bag with a built in battery unit for portable electronic devices, wherein the battery unit is enclosed between the interior lining and the exterior such that it is concealed and separate from the main compartment of the bag. The present invention provides a bag that can be used in a conventional manner, and an external battery unit that is securely held in the bag for use when the user is not near an electrical outlet. The prior art devices include pockets in which charging units can be held, but the pockets interfere with the usage of the bag and the charging units can easily fall out therefrom. Thus, the present invention discloses a device that overcomes drawbacks of the prior art devices.

It is therefore submitted that the present invention is substantially divergent in design elements from the prior art, and consequently it is clear that there is a need in the art for an improvement to existing external charging units for electronic devices. In this regard, the instant invention substantially fulfills these needs.

SUMMARY OF THE INVENTION

In view of the foregoing disadvantages inherent in the known types of bags with a means for charging mobile devices now present in the prior art, the present invention provides a new and improved bag with a portable electronic device charger wherein the same can be utilized for carrying and charging portable electronic devices.

It is therefore an object of the invention to provide a new and improved bag with a portable electronic device charger that has all of the advantages of the prior art and none of the disadvantages.

Another object of the present invention is to provide a new and improved bag with a portable electronic device charger that can be utilized as a conventional bag while securely holding a battery unit therein.

Yet another object of the present invention is to provide a new and improved bag with a portable electronic device charger having a battery unit, a charging cable, and a retractable power cable, wherein each of the foregoing components are disposed in an interior compartment of the bag.

Still yet another object of the present invention is to provide a new and improved bag with a portable electronic device charger having a battery unit that comprises a plurality of USB ports for charging multiple electronic devices concurrently.

Still yet another object of the present invention is to provide a new and improved bag with a portable electronic device charger having a battery unit with an indicator light for indicating that one or more electronic devices connected thereto have been completely charged.

Still yet another object of the present invention is to provide a new and improved bag with a portable electronic device charger wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
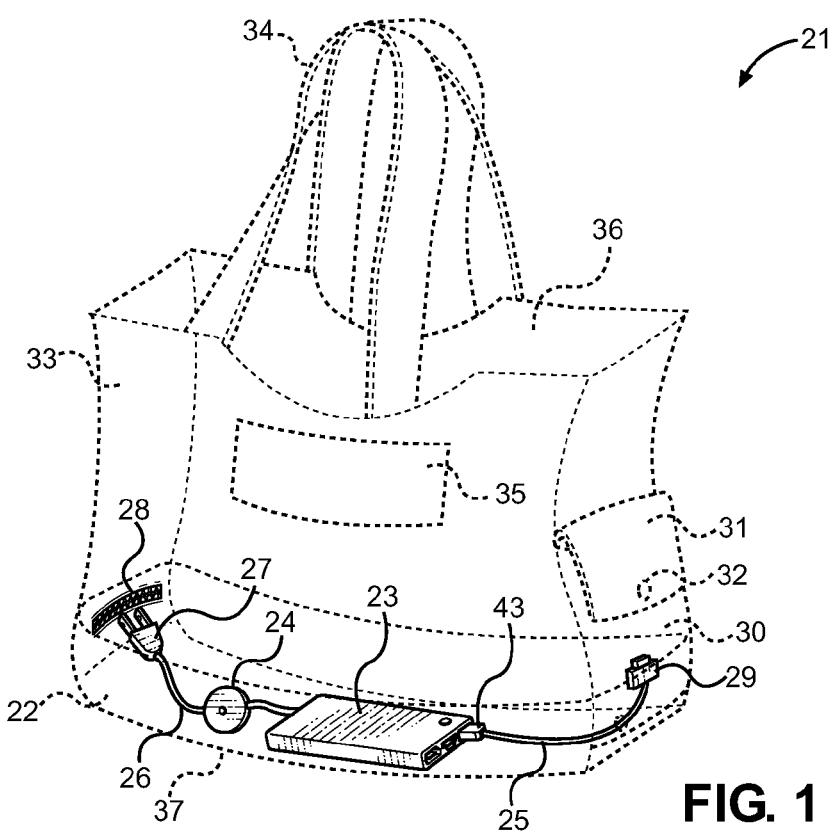
FIG. 1 shows a cut out view of the present invention.

References are made herein to the attached drawings. Like reference numerals are used throughout the drawings to depict like or similar elements of the bag with a portable electronic device charger. For the purposes of presenting a brief and clear description of the present invention, the preferred embodiment will be discussed as used to carry and charge portable electronic devices. The figures are intended for representative purposes only and should not be considered to be limiting in any respect.

Referring now to FIG. 1, there is shown a cut out view of the present invention. The exemplary embodiment of the bag with a portable electronic device 21 comprises a main compartment 33 having an opening 36 at a top portion thereof and one or more handles 34 attached thereto. The bag 21 further comprises an exterior with a front pouch 35 and an interior having a lining therein. In a preferred embodiment, the lining is waterproof or water resistant. The space between the lining and the exterior of the bag 21 defines an interior compartment 22 that spans the length and width of the bag 21 along the bottom portion 37 thereof.

The interior compartment 22 is concealed under the lining. In one embodiment, the interior compartment 22 is not accessible by the user via the opening 36 of the main compartment 33. Alternatively, the lining in the interior of the bag may be opened to provide access to the interior compartment 22. The volume of the interior compartment 22 is relatively less than the volume of the main compartment 33. In this way, the interior compartment 22 does not detract from nor significantly affect the standard usage of the main compartment 33. Thus, the present bag 21 resembles a conventional bag or a purse when viewed from the outside, and can be used to store and carry various items therein.

The interior compartment 22 comprises a battery unit 23 that is removably connected to a power cable 26 on one end and a charging cable 25 on the opposite end. The battery unit 23 is preferably waterproof so that it is able to repel water if the bag 21 is exposed to water or moisture. The power cable 26 is retractable via a reel 24. In some embodiments, the reel 24 may be spring-biased. The first end of the power cable 26 comprises a plug 27 thereon. The plug 27 can be extended out of the interior compartment 22 via an opening having a zipper 28. The second end of the power cable 26 is connected to the battery unit 23.

The charging cable 25 comprises a first end having a USB connection 43 and a second end having a mobile device connection 29. It is contemplated that the battery unit 23 comprises at least one USB port so as to connect to the charging cable 25 via the USB connection 43. The charging cable 25 can be threaded through an aperture disposed along one side of the bag 21 so that the mobile device connection 29 can be disposed in a side pocket 30 that is adjacent to the interior compartment 22. The pocket 30 is located on one side of the bag 21 at the exterior thereof. The pocket 30 comprises a flap 31 and fasteners 32 for closing the flap 31.

Figure 2:
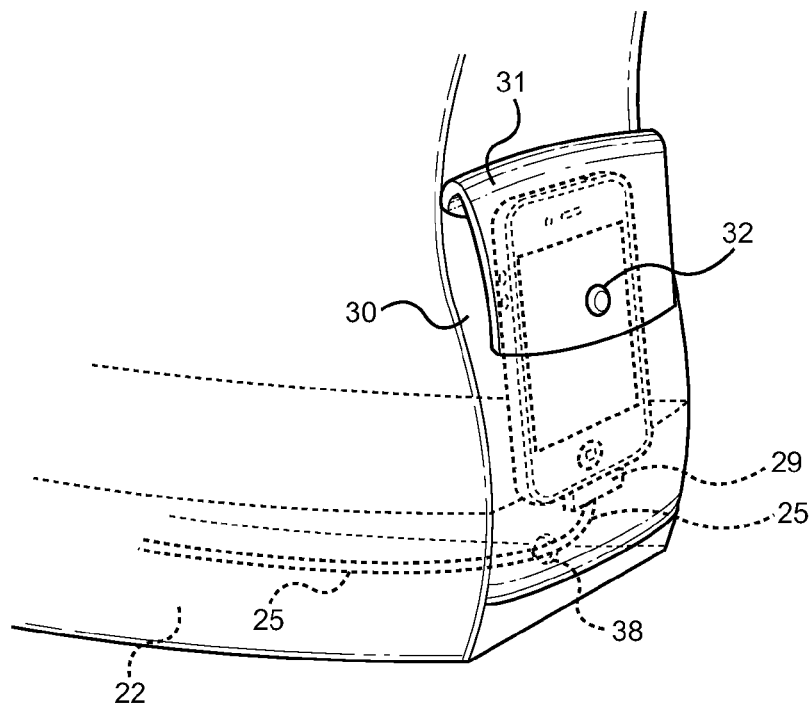
FIG. 2 shows a close up view of the charging cable as connected to a mobile phone placed inside of the pocket.

Referring now to FIG. 2, there is shown a close up view of the charging cable 25 as connected to a mobile phone that is placed inside of the pocket 30 of the bag. In the illustrated embodiment, the pocket 30 is stitched onto one side of the bag. The pocket 30 comprises an opening having a flap 31 and fasteners 32 for closing the flap 31. The fasteners 32 on the flap 31 are directly aligned with the fasteners 32 near the opening of the pocket 30 so that the two fasteners 32 can be removably attached together. The fasteners 32 may comprise snap buttons, as shown in the illustrated embodiment. Alternatively, and without limitation, the fasteners 32 may comprise a zipper, hook and loop fasteners, or the like. In this way, the mobile phone can remain secured inside of the pocket 30 and is prevented from falling out therefrom.

The pocket 30 is substantially rectangular and is constructed to store one or more mobile phones of various sizes therein so that the phones can rest in a substantially upright position when placed inside of the pocket 30. In some embodiments, the pocket may be constructed to hold larger portable electronic devices, such as a tablet computer, or a laptop therein. Additionally, the pocket 30 may comprise padding for protecting portable electronic devices held therein.

The interior of the pocket 30 comprises an aperture 38 at a lower end of the pocket 30. The aperture 38 is adapted to thread the charging cable 25 therethrough so that the mobile device connection 29 of the charging cable 25 is disposed inside of the pocket 30 and the remaining portion of the charging cable 25 is disposed inside of the interior compartment 22. The aperture 38 is dimensioned so that it is not large enough to pull the mobile device connection 29 therethrough. In this way, the mobile device connection 29 remains inside of the pocket 30.

Figure 3:
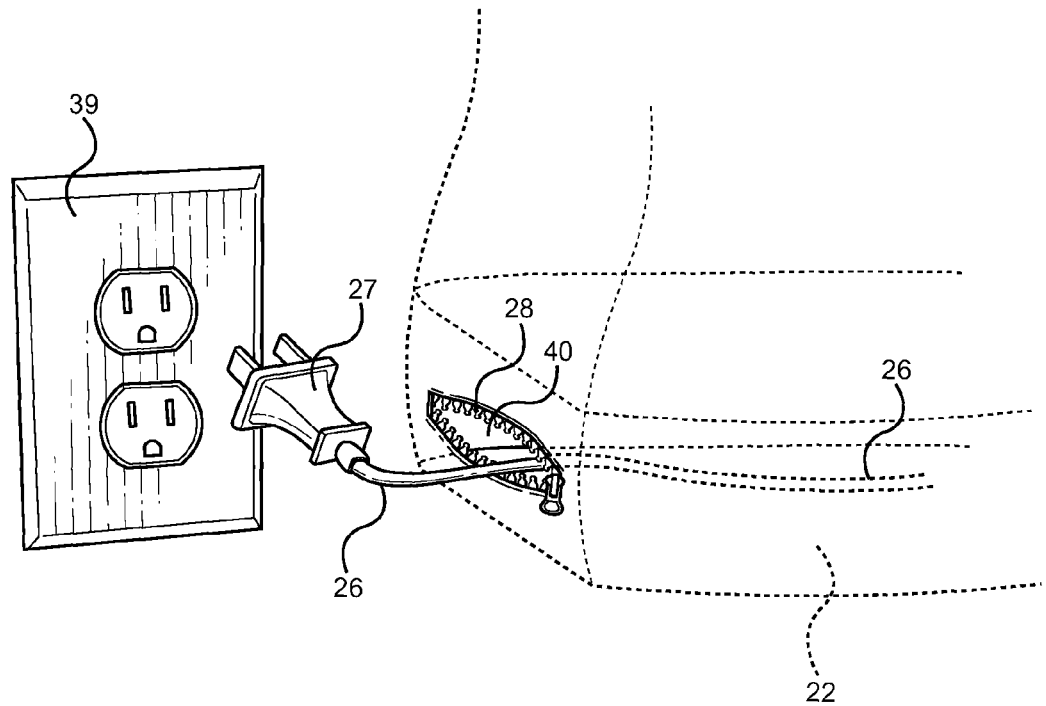
FIG. 3 shows a close up view of the power cable of the present invention as extended out of the bag.

Referring now to FIG. 3, there is shown a close up view of the power cable 26 of the present invention as extended out of the side opening 40 of the bag. The side opening 40 comprises a zipper 28 that spans the length thereof. The zipper 28 may be closed to maintain the power cable 26 in the interior compartment 22, or opened to connect the plug 27 of the power cable 26 to an electrical outlet 39. The side opening 40 is dimensioned so that the user can reach into the interior compartment 22 to retrieve the power cable 26. When an electrical connection is established between the plug 27 and the outlet 39, the outlet 39 supplies power to the battery unit 23, which can be reserved for later use to charge portable electronic devices when electrical outlets are not readily available or accessible to the user.

In one embodiment, a portion of the power cable 26 may be wrapped around a reel so that the power cable 26 is prevented from becoming entangled. The reel may be disk shaped and comprise an interior volume having a spring therein so that the reel is spring-biased. The reel is adapted to secure the power cable 26 at a desired length when extended, and automatically retract back into the interior compartment 22 after use.

Figure 4:
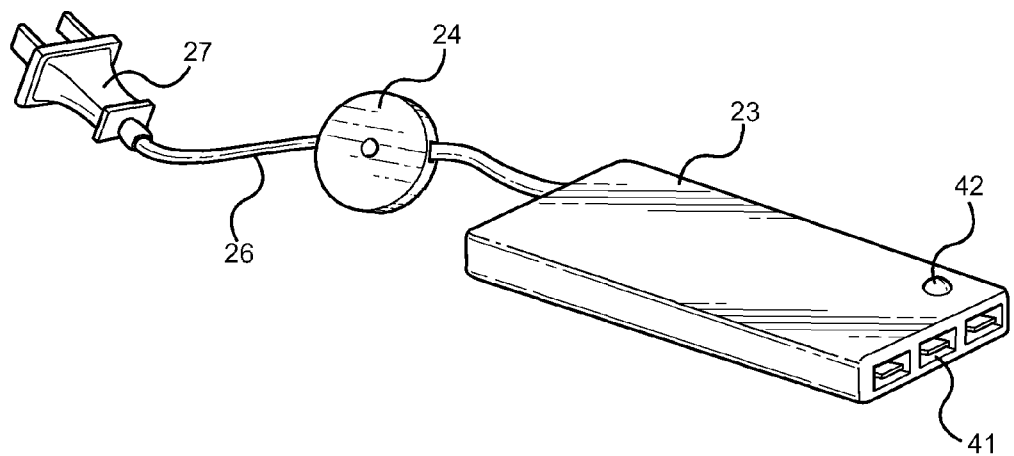
FIG. 4 shows a perspective view of the battery unit of the present invention as connected to the power cable.

Referring now to FIG. 4, there is shown a view of the battery unit 23 of the present invention as connected to a power cable 26. The battery unit 23 is substantially rectangular and has a first end opposite a second end. The first end of the battery unit 23 is connected to the second end of the power cable 26. The first end of the power cable 26 comprises a plug 27, which can be pulled away from or retracted closer towards the first end of the battery unit 23 via the reel 24 disposed between the first and second ends of the power cable 26.

The plug 27 of the power cable 26 can be connected to an electrical outlet to supply power to the battery unit 23. The battery unit 23 may be connected to or disconnected from a portable electronic device while it is being recharged. If the battery unit 23 is connected to a portable electronic device while the plug 27 is connected to an electrical outlet, the device and the battery unit 23 may be charged concurrently via the electrical outlet. If the battery unit 23 is disconnected from a portable electronic device while the plug 27 is connected to an electrical outlet, the battery unit 23 is charged so that it has enough power to supply a portable electronic device when the user does not have access to an electrical outlet at a later time.

The second end of the battery unit 23 comprises a plurality of USB ports 41 disposed in a linear configuration. In this way, the battery unit 23 can be connected to multiple charging cables having a USB connection thereon, thereby charging multiple portable electronic devices concurrently. The battery unit 23 further comprises an indicator light 42 disposed at a top surface thereof, wherein the indicator light 42 may comprise LED light. The indicator light 42 is adapted to illuminate when the electronic devices that is connected to the battery unit 23 has been fully charged. The illumination may be visible to the user through the interior lining of the bag, which may be composed of a transparent material or a thin piece of fabric that would allow the light to shine therethrough. Alternatively, the indicator light 42 may illuminate one color while the device is being charged and illuminate another color when the device has been fully charged.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bag with a portable electronic device charger, comprising:
    a bag with an exterior and an interior having a lining, wherein a space between said lining and said exterior at a bottom portion of said bag defines an interior compartment;
    a battery unit having a first end and a second end;
    a power cable connected to said battery unit;
    a charging cable connected to said battery unit; and
    wherein said battery unit, said power cable, and said charging cable are enclosed within said interior compartment.

2. The bag with a portable electronic device charger of claim 1, wherein said exterior of said bag further comprises a pocket with a defined interior volume;
    wherein at least one aperture disposed in said interior volume of said pocket for receiving said charging cable therethrough.

3. The bag with a portable electronic device charger of claim 1, wherein said bag further comprises a side opening for receiving said power cable therethrough.

4. The bag with a portable electronic device charger of claim 3, further comprising a zipper along said side opening for opening and closing said side opening.

5. The bag with a portable electronic device charger of claim 1, wherein said power cable is retractable via a reel.

6. The bag with a portable electronic device charger of claim 1, wherein said second end of said battery unit comprises a plurality of USB ports for connecting to said charging cable.

7. The bag with a portable electronic device charger of claim 6, wherein said charging cable comprises a first end having a USB connection and a second end having a mobile device connection;
    wherein said USB connection of said charging cable connected to one of said plurality of USB ports of said battery unit; and
    said mobile device connection of said charging cable adapted to connect to a portable electronic device.

8. The bag with a portable electronic device charger of claim 1, wherein said battery unit further comprises an indicator light for indicating that a portable electronic device is fully charged.

9. The bag with a portable electronic device charger of claim 1, wherein said power cable comprises a power plug for connecting to an electrical outlet.

* * * * *